United States Patent [19]
Makishima

[11] Patent Number: 5,706,387
[45] Date of Patent: Jan. 6, 1998

[54] MOVIE VIDEO CAMERA, APPARATUS FOR REPRODUCING MOVIE VIDEO SIGNAL, METHOD OF RECORDING MOVIE VIDEO SIGNAL, AND METHOD OF REPRODUCING SAME

[75] Inventor: Sugio Makishima, Asaka, Japan

[73] Assignee: Fuji Photo Film Co., Ltd., Kanagawa, Japan

[21] Appl. No.: 578,436

[22] Filed: Dec. 26, 1995

[30] Foreign Application Priority Data

Dec. 28, 1994 [JP] Japan ................. 6-337430

[51] Int. Cl.$^6$ ............ H04N 5/235; H04N 5/238; H04N 5/76
[52] U.S. Cl. ............ 386/120; 348/220; 348/221; 348/362
[58] Field of Search ............ 348/220, 221, 348/362, 364; 386/120, 38, 121; 358/906, 909.1; H04N 5/225, 5/235, 5/76, 5/238

[56] References Cited

U.S. PATENT DOCUMENTS

| | | | |
|---|---|---|---|
| 4,819,059 | 4/1989 | Pape | 348/220 |
| 4,825,291 | 4/1989 | Mimura et al. | 348/362 |
| 4,910,600 | 3/1990 | Kondo | 348/364 |
| 4,984,088 | 1/1991 | Tani et al. | 348/364 |
| 5,019,911 | 5/1991 | Okino et al. | 348/364 |
| 5,051,833 | 9/1991 | Tsuji | 348/364 |
| 5,440,343 | 8/1995 | Parulski et al. | 348/220 |
| 5,471,242 | 11/1995 | Kondo | 348/362 |
| 5,473,375 | 12/1995 | Takayama et al. | 348/364 |
| 5,625,411 | 4/1997 | Inuiya et al. | 348/220 |

Primary Examiner—Thai Tran

[57] ABSTRACT

A blur-free printed image having a high vertical resolution is obtained from a signal obtained by photography using a movie video camera. Video signals of first and second fields are outputted by a CCD every 1/60 of a second. Ordinarily, these video signals are selected by a multiplexer in such a manner that the first and second fields are outputted alternately every 1/60 of a second. At a prescribed point in time, video signals of first and second fields obtained by simultaneous photography are outputted by the multiplexer. In this case a PI signal is added onto the video signals in a circuit for adding on synchronizing signals and the PI signal, and the resulting video signals are then recorded on a video tape. When the video signals are printed, the PI signal is detected and video signals of first and second fields obtained by simultaneous photography are recognized based upon the PI signal. The printed image is obtained from these video signals.

4 Claims, 7 Drawing Sheets

MOVIE VIDEO CAMERA, APPARATUS FOR REPRODUCING MOVIE VIDEO SIGNAL, METHOD OF RECORDING MOVIE VIDEO SIGNAL, AND METHOD OF REPRODUCING SAME

BACKGROUND OF THE INVENTION

1. Field of the Invention

This invention relates to a camera for and method of recording a movie video signal on a recording medium, as well as an apparatus for and method of reproducing a movie video signal that has been recorded on a recording medium.

2. Description of the Related Art

Movie photography using a video camera includes field photography and frame photography. In field photography, photography of a first field and photography of a second field is performed alternately every 1/60 of a second. In frame photography, photography of frame image is performed every 1/30 of a second.

Since photography is performed every 1/60 of a second in field photography, smooth movie playback is possible. In a case where a frame image is printed from a signal obtained by field photography, the video signal of the first field and the video signal of the second field are subjected to interlaced scanning. However, since there is a shift of 1/60 of a second between the first and second fields, the printed image obtained is blurred.

In frame photography, the signal representing the frame image at the time of photography is obtained and, as a result, it is possible to obtain a high-quality printed image that is not blurred. In a case where movie playback is performed based upon frame photography, the processing executed is as follows: A video signal representing a frame image obtained by frame photography is divided into a video signal of an odd number of lines and a video signal of an even number of lines. The video signal of the odd number of lines is made a dummy video signal representing the first field image and the video signal of the even number of lines is made a dummy video signal representing the second field image. The dummy video signals representing the two field images are outputted alternately every 1/60 of a second and movie playback is performed by interlaced scanning. With movie playback of this kind, flicker is produced and the movie image appears unnatural.

SUMMARY OF THE INVENTION

An object of the present invention is to obtain a printed image having a high vertical resolution and obtain a movie image that does not appear unnatural.

A movie video camera according to the present invention comprises a solid-state electronic image sensing device having a first light-receiving section for outputting a video signal of a first field and a second light-receiving section for outputting a video signal of a second field; means for controlling the solid-state electronic image sensing device so as to repeat, a prescribed number of times, movie video-signal output processing in which a video signal of a first field and a video signal of a second field are outputted in order by exposing the first light-receiving section and the second light-receiving section at different timings, and execute movie/still video-signal output processing in which a video signal of a first field and a video signal of a second field are outputted in order by exposing the first light-receiving section and the second light-receiving section at the same timing a single time after the movie video-signal output processing has been repeated the prescribed number of times; identification code generating means for generating and outputting codes for identifying the video signals of the first and second fields outputted from the solid-state image sensing device by the movie/still video-signal output processing; and recording means for recording, on a recording medium, the video signals outputted by the solid-state image sensing device and the identification codes outputted by the identification code generating means.

A method of recording a movie video signal according to the present invention comprises the steps of controlling a solid-state electronic image sensing device, which has a first light-receiving section for outputting a video signal of a first field and a second light-receiving section for outputting a video signal of a second field, so as to repeat, a prescribed number of times, movie video-signal output processing in which a video signal of a first field and a video signal of a second field are outputted in order by exposing the first light-receiving section and the second light-receiving section of the solid-state electronic image sensing device at different timings, and execute movie/still video-signal output processing in which a video signal of a first field and a video signal of a second field are outputted in order by exposing the first light-receiving section and the second light-receiving section at the same timing a single time after the movie video-signal output processing has been repeated the prescribed number of times; generating codes for identifying the video signals obtained by the simultaneous exposure; and recording, on a recording medium, the video signals outputted by the solid-state image sensing device and the generated identification codes.

When recording is performed in the manner described above, playback is carried out as follows:

In terms of the reproduction apparatus, the apparatus comprises reading means for reading video signals and codes from a recording medium, wherein a video signal of a first field and a video signal of a second field are recorded on the recording medium repeatedly a prescribed number of times, video signals of first and second fields being obtained by exposing, at different timings, a first light-receiving section, which outputs a video signal of a first field, and a second light-receiving section, which outputs a video signal of a second field, of a solid-state electronic image sensing device, a video signal of a first field and a video signal of a second field, which are obtained by exposing the first light-receiving section and the second light-receiving section at the same timing a single time after the recording performed the prescribed number of times, are recorded on the recording medium, and codes for identifying the video signals of the first and second fields obtained by the simultaneous exposure are recorded on the recording medium, the reading means reading these video signals and these codes from the recording medium; reproducing means for reproducing the video signals read by the reading means; identification-code extracting means for extracting the identification codes read by the reading means; and video-signal extracting means for extracting and outputting, based upon the identification codes extracted by the reading means, the video signals of simultaneous exposure read by the reading means.

In terms of the reproduction method, the method comprises the steps of reading video signals and codes from a recording medium, wherein a video signal of a first field and a video signal of a second field are recorded on the recording medium repeatedly a prescribed number of times, video signals of first and second fields being obtained by exposing, at different timings, a first light-receiving section, which outputs a video signal of a first field, and a second light-receiving section, which outputs a video signal of a second field, of a solid-state electronic image sensing device, a video signal of a first field and a video signal of a second field, which are obtained by exposing the first light-receiving section and the second light-receiving section at the same timing a single time after the recording performed the prescribed number of times, are recorded on the recording medium, and codes for identifying the video signals of the first and second fields obtained by the simultaneous exposure are recorded on the recording medium, these video signals and these codes being read from the recording medium; reproducing the video signals that have been read; extracting the identification codes that have been read; and extracting and outputting, based upon the identification codes that have been extracted, the video signals of simultaneous exposure that have been read.

In accordance with the present invention, the video signals of the first and second fields obtained by exposure at different timings, the video signals of the first and second fields obtained by simultaneous exposure and the identification codes are recorded on the recording medium.

Video signals are read from the recording medium and a movie image is displayed on a display unit based upon the video signals that have been read. Simultaneous exposure is performed only one time every prescribed number of times, and the video signals of the first and second fields are obtained in order by exposure at different timings (e.g., every 1/60 of a second). This makes it possible to prevent flickering of the reproduced movie image.

Further, the video signals and the identification codes are read from the recording medium and the video signals of the first and second fields obtained by the simultaneous exposure can be recognized by extracting the identification codes. A printed image of a frame image can be formed using these video signals. Since the printed image is obtained from video signals resulting from simultaneous exposure, the printed image is free of blurring even if a moving subject is printed.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
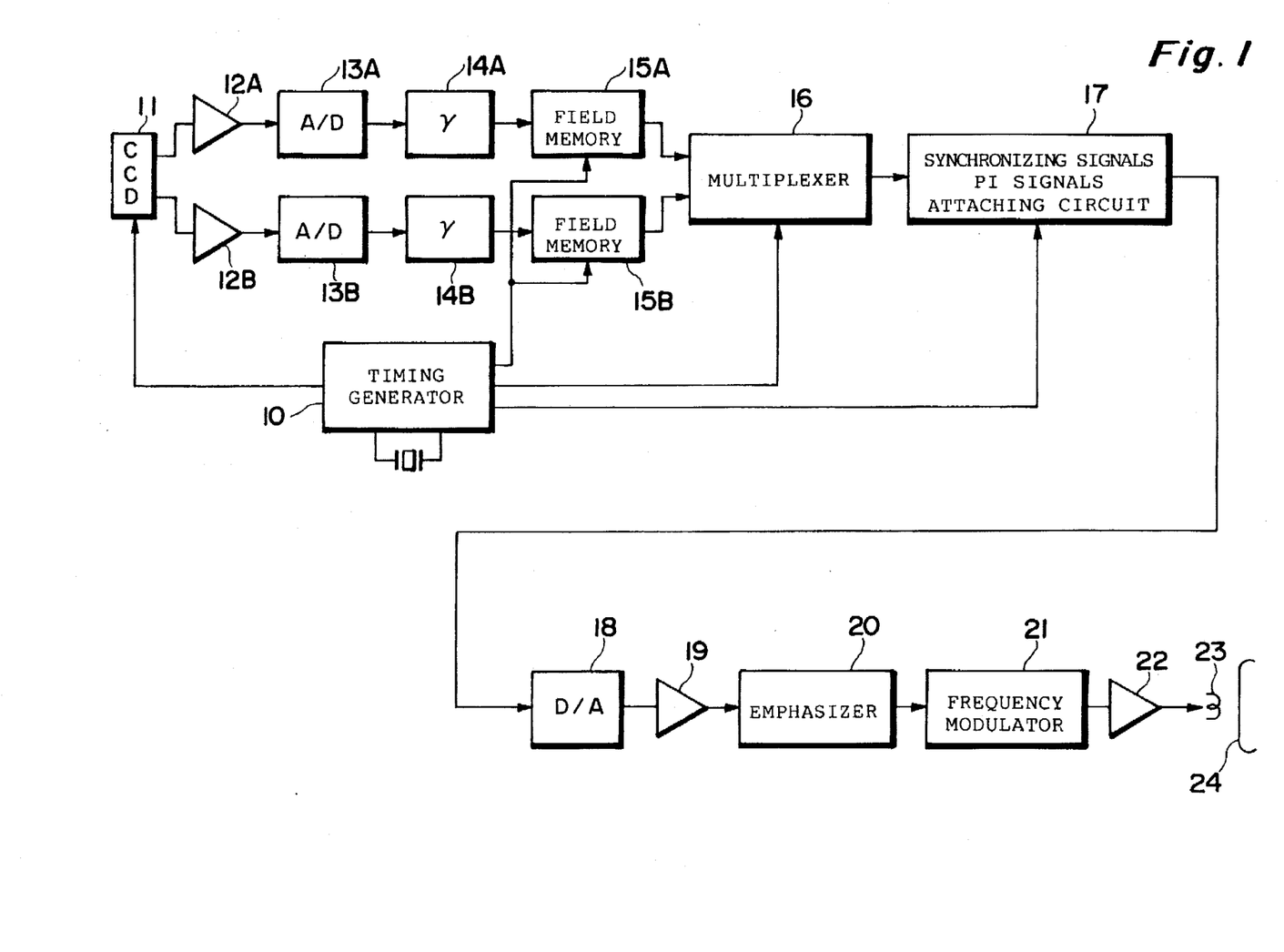
FIG. 1 is a block diagram illustrating the electrical configuration of an analog movie video camera.

FIG. 1 is a block diagram illustrating the electrical configuration of an analog movie video camera according to an embodiment of the present invention.

Figure 3:
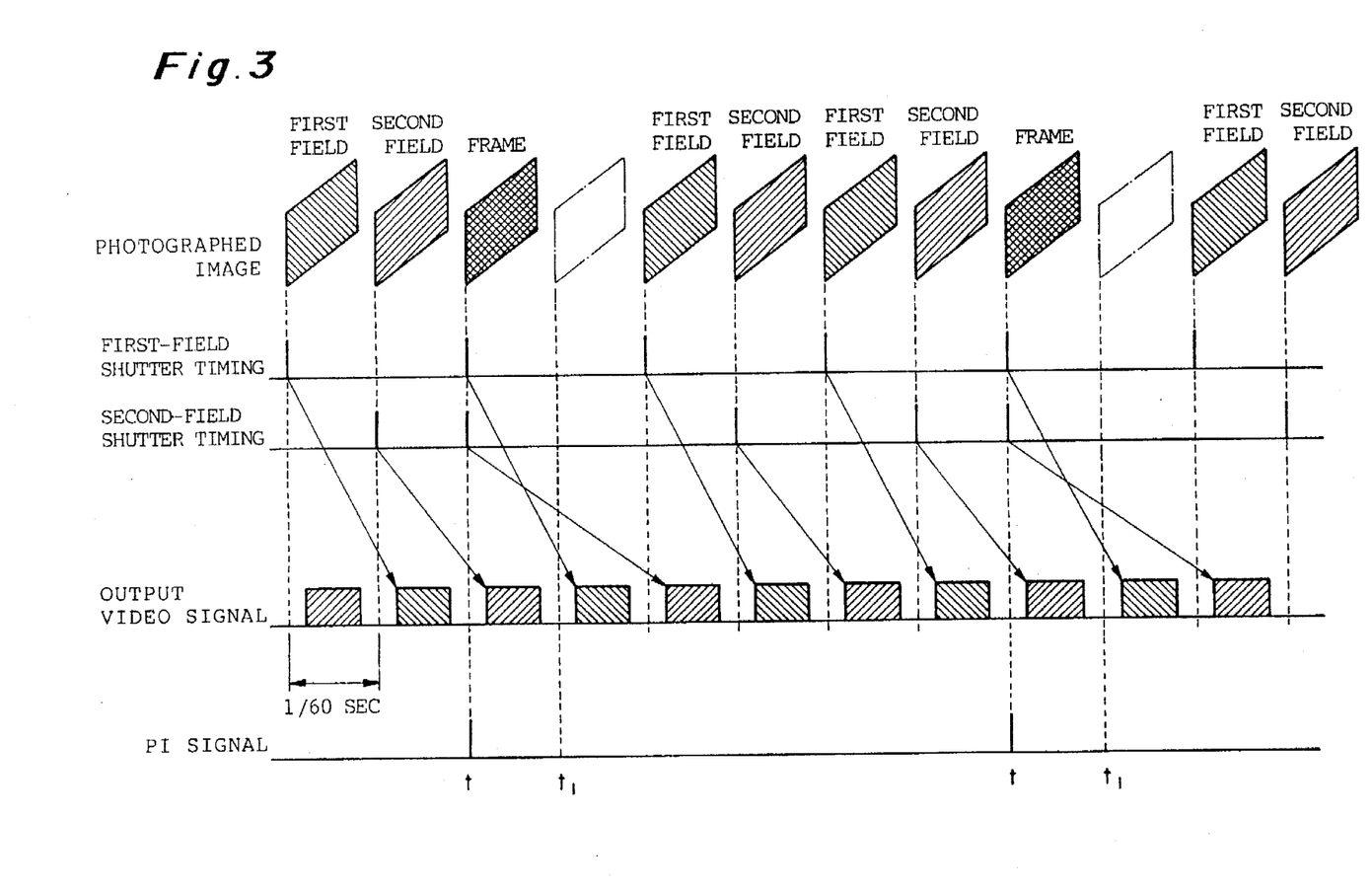
FIG. 3 is a timing chart showing the output timing of an analog video signal.

As shown in FIG. 3, a movie video camera records a video signal representing the image of a first field and a video signal representing the image of a second field on a video tape alternately every 1/60 of a second. Ordinarily, the movie video camera shown in FIG. 1 alternately records the video signal representing the image of the first field and the video signal representing the image of the second field, which are obtained by photography every 1/60 of a second. However, at a predetermined time t (the time t should be such that the user will not perceive flickering when video signals are reproduced as a movie image), the movie video camera records a video signal representing the image of a first field and a video signal representing the image of a second field obtained by simultaneous photography. As a result, a blur-free image frame is obtained from the video signal representing the image of the first field and the video signal representing the image of the second field, these video signals being obtained by simultaneous photography. A printed image can be obtained from this frame image. The user can be prevented from perceiving flicker also when the movie image is reproduced.

As shown in FIG. 1, the movie video camera includes a CCD 11 serving as a solid-state electronic image sensing device. The CCD 11 is capable of photographing the image of the first field and the image of the second field simultaneously every 1/60 of a second, and of outputting the video signal representing the image of the first field and the video signal representing the image of the second field separately but at the same time. Exposure and sweeping out of signal charge are controlled by a timing generator 10.

Figure 2:
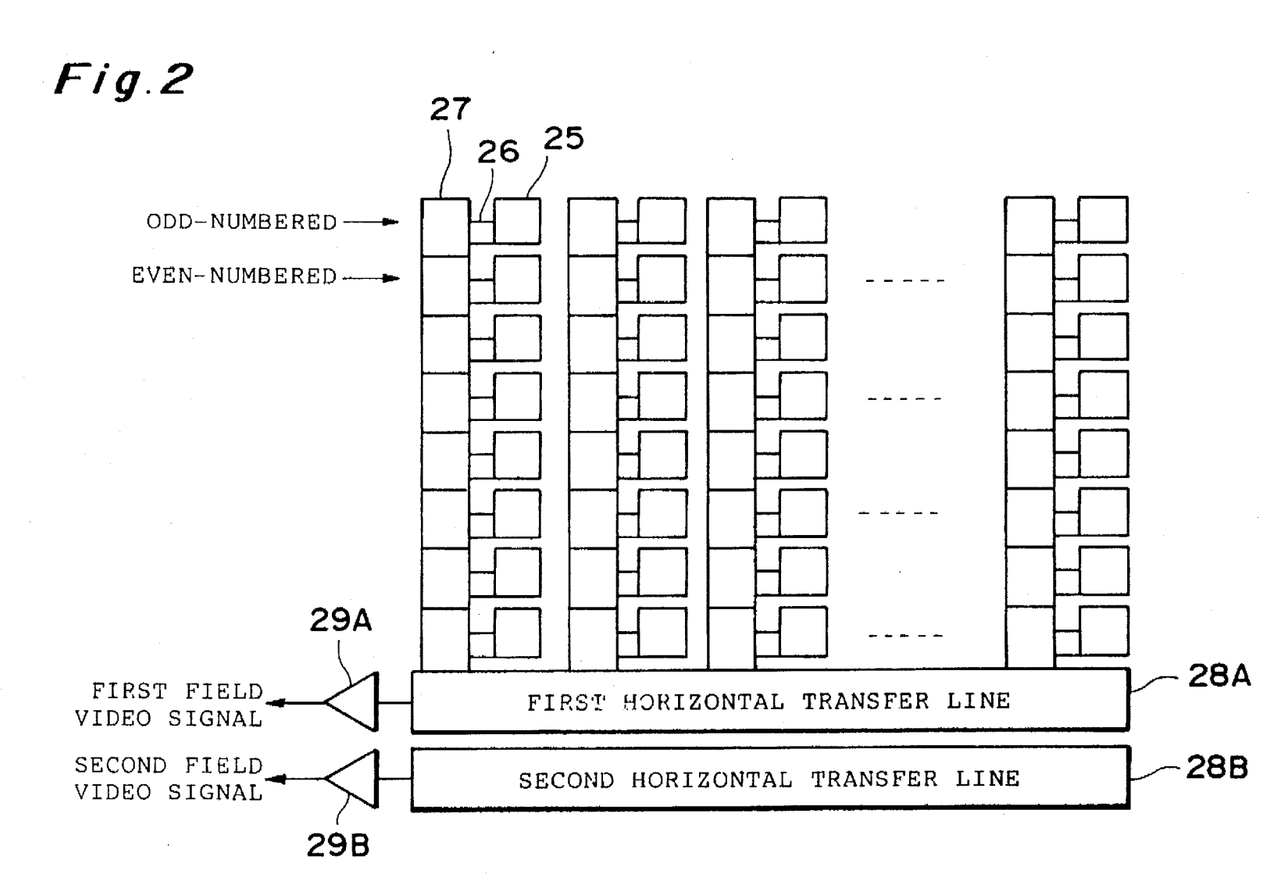
FIG. 2 illustrates the construction of a CCD.

The construction of the CCD 11 is shown in FIG. 2.

As shown in FIG. 2, the CCD 11 has an array of a number of photoelectric transducers 25 for accumulating signal charge. Vertical transfer lines 27 for vertically transferring the signal charge stored in the photoelectric transducers 25 are disposed adjacent the transducers 25. Transfer gates 26 for transferring the signal charge stored in the photoelectric transducers 25 to the vertical transfer lines 27 are provided between the transducers 25 and the vertical transfer line 27s.

The lower side of each vertical transfer line 27 in FIG. 2 is the output side of the vertical transfer line 27. A first horizontal transfer line 28A and a second horizontal transfer line 28B are connected to the output sides of the vertical transfer lines 27. A floating-diode amplifier circuit 29A is connected to an output terminal of the first horizontal transfer line 28A, and a floating-diode amplifier circuit 29B is connected to an output terminal of the second horizontal transfer line 28B.

Signal charge stored in the photoelectric transducers 25 of odd-numbered rows are applied from the vertical transfer lines 27 to the first horizontal transfer line 28A via the transfer gates 26 and the signal charge is outputted from the floating-diode amplifier circuit 29A as a video signal of a first field. Signal charge stored in the photoelectric transducers 25 of even-numbered rows are applied from the vertical transfer lines 27 to the second horizontal transfer line 28b via the transfer gates 26 and the signal charge is outputted from the floating-diode amplifier circuit 29B as a video signal of a second field.

With reference again to FIG. 1, the video signal of the first field outputted by the CCD 11 is applied to the amplifier circuit 12A and converted to digital image data of the first field by an analog/digital (A/D) converter circuit 13A. The digital image data of the first field is subjected to a gamma correction in a gamma correction circuit 14A and the corrected data is then stored in a field memory 15A.

The video signal of the second field outputted by the CCD 11 is applied to an analog/digital (A/D) converter circuit 13B via an amplifier circuit 12B, the signal is converted to digital image data of the second field and the data is stored in a field memory 15B via a gamma correction circuit 14B.

The digital image data of the first and second fields stored in the field memories 15A and 15B is read out of these memories and applied to a multiplexer 16. Ordinarily, the multiplexer 16 selects the input digital image data in such a manner that the digital image data of the first field and the digital image data of the second field are outputted alternately every 1/60 of a second. At the predetermined timing t as shown in FIG. 3, the multiplexer 16 selects both digital image data of a first field and digital image data of a second field obtained by simultaneous photography. The digital image data of the first field and the digital image data of the second field obtained by simultaneous photography would be outputted from the field memories 15A and 15B upon being shifted in time and would pass through the multiplexer 16. Neither the digital image data of the first field nor the digital image data of the second field is outputted from the multiplexer 16 at a timing t1, which is 1/60 of a second after the predetermined timing t.

Figure 4:
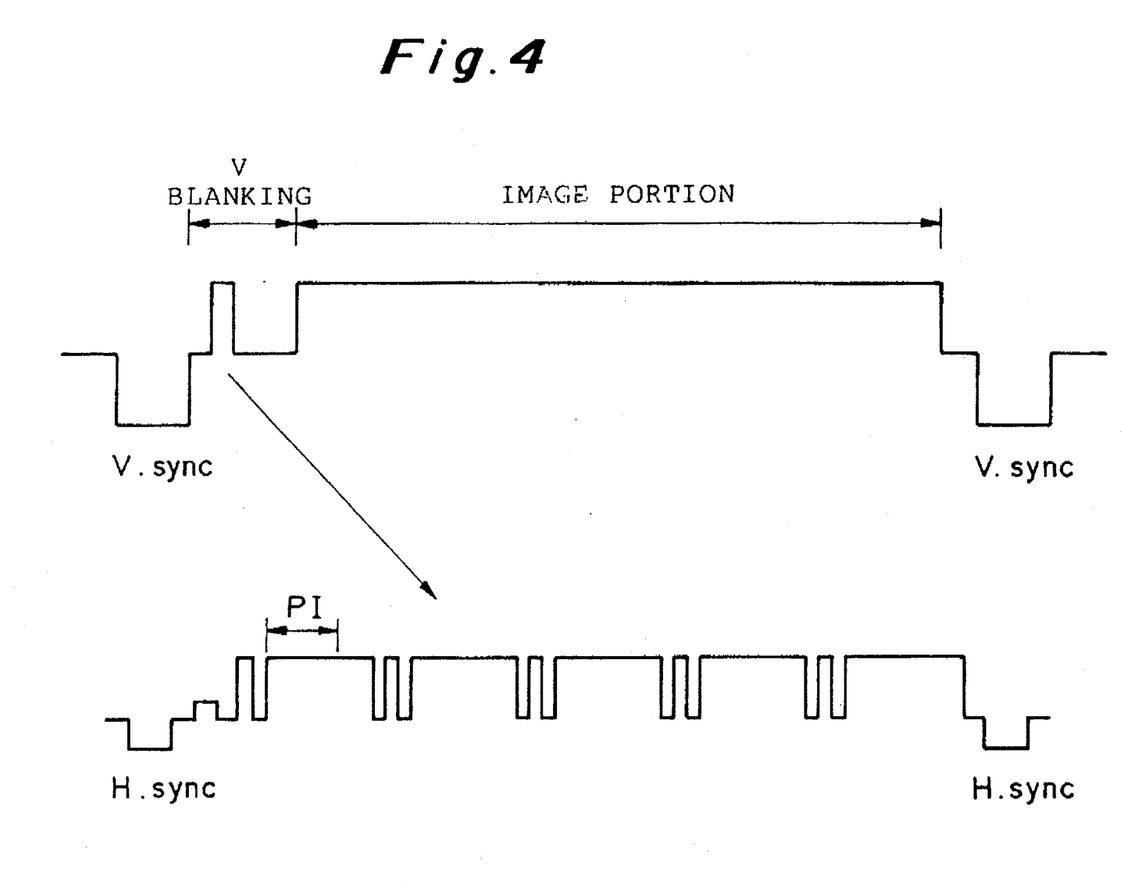
FIG. 4 illustrates the relationship between a PI signal and a V blanking interval.

The digital image data outputted by the multiplexer 16 is applied to a circuit 17. More specifically, the circuit 17 attaches synchronizing signals (a vertical synchronizing signal and a horizontal synchronizing signal) to the input digital image data of the first and second fields. Further, as shown in FIG. 4, the circuit 17 attaches a PI (print inhibit) signal, which is indicative of the digital image data obtained by simultaneous photography, to the digital image data of the first and second fields obtained by simultaneous photography at a predetermined timing. The PI signal is inserted in the V blanking interval of the digital image data. As shown in FIG. 4, part of the V blanking interval neighboring the interval of a vertical synchronizing signal V.sync is an interval that can be used by the user. The PI signal is applied in this user interval with regard to the digital image data of the first and second fields obtained by simultaneous photography at the predetermined timing. The timing at which the PI signal is added on is decided using the vertical synchronizing signal V.sync as a reference. Accordingly, the PI signal can be detected. Whether or not digital image data is digital image data of the first and second fields obtained by simultaneous photography can be judged based upon whether or not the PI signal is detected. Though signals other than PI signal are attached in the V blanking interval, these signals need not be described here.

The digital image data outputted by the circuit 17 for adding on the synchronizing signals and the PI signal is applied to a digital/analog (D/A) converter circuit 18, which converts the data to an analog video signal. The analog video signal is amplified by an amplifier circuit 19 and the amplified signal is subjected to emphasizing processing in an emphasizing circuit 20. The analog video signal outputted by the emphasizing circuit 20 is frequency modulated in a frequency modulating (FM) circuit 21 and then applied to a magnetic head 23 via an amplifier circuit 22. The frequency-modulated analog video signal is recorded on a video tape 24 by the magnetic head 23.

Figure 5:
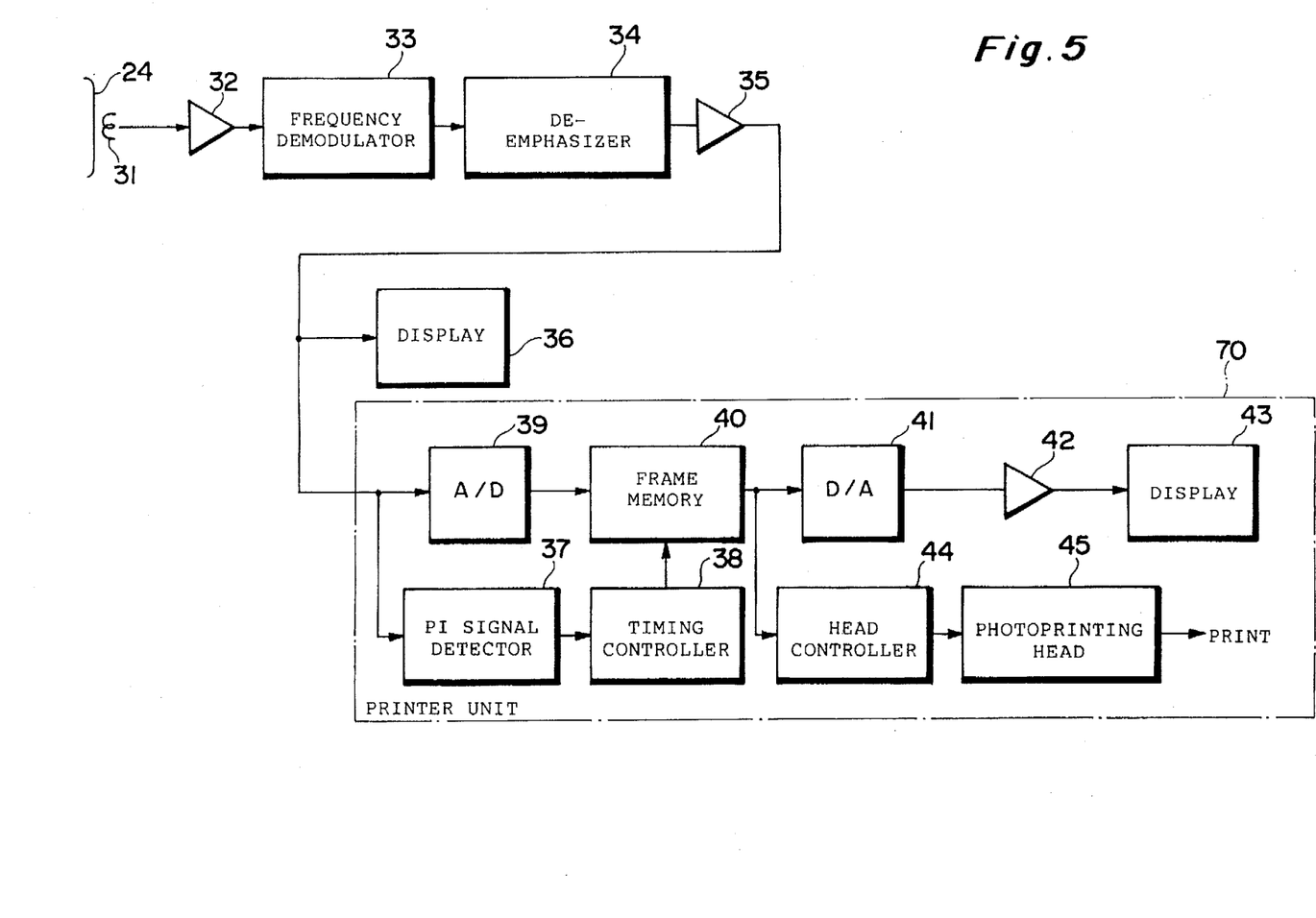
FIG. 5 is a block diagram showing the electrical configuration of a reproduction apparatus having a function for printing a video tape on which an analog video signal has been recorded.

FIG. 5 is a block diagram showing the electrical configuration of an apparatus for reproducing the analog video signal has been recorded on the video tape. The reproduction apparatus shown in FIG. 5 has the function of a printer.

The analog video signal that has been recorded on the video tape 24 is read by a magnetic head 31 and the read signal is amplified by an amplifier circuit 32. The analog video signal is applied to a frequency demodulating circuit 33, where the signal undergoes frequency demodulation and is then applied to a de-emphasizing circuit 34. The analog video signal is subjected to de-emphasizing processing in the de-emphasizing circuit 34 and the resulting signal is amplified by an amplifier circuit 35. The amplified analog video signal is applied to a display unit 36 as well as to an A/D converter circuit 39 and a PI-signal detector circuit 37, which are included in a printer unit 70.

The analog video signal is applied to the display unit 36 so that the movie image represented by the analog video signal is displayed on the screen of the display unit 36. While observing the display screen, the user searches for the desired picture to be printed.

When a print command is entered from the input unit (not shown) while the desired picture is being displayed, the analog video signal read from the video tape 24 is converted to digital image data in the A/D converter circuit 39 and the digital image data is applied to a frame memory 40. The PI signal that has been recorded with the vertical synchronizing signal V.sync serving as the reference is detected in the analog video signal by means of the PI-signal detector circuit 37. When the PI signal is detected by the PI-signal detector circuit 37, the signal indicative of detection is applied to a timing control circuit 38. When the signal indicative of detection of the PI signal enters the timing control circuit 38, the timing control circuit 38 applies a write control signal to the frame memory 40 and the digital image data outputted from the A/D converter circuit 39 is stored in the frame memory 40.

When the PI signal has been detected in the PI-signal detector circuit 37, the digital image data that has been stored in the frame memory 40 is data of a frame image comprising digital image data of a first field and digital image data of a second field obtained by simultaneous photography. This means that no shift in time has occurred.

The digital image data of the frame image that has been stored in the frame memory 40 is applied to a D/A converter circuit 41 and a head control circuit 44.

The digital image data is converted to an analog video signal by the D/A converter circuit 41 and the analog video signal is applied to a monitor display unit 43 via an amplifier circuit 42. As a result, the image desired to be printed is displayed and can be verified.

When the digital image data is applied to the head control circuit 44, a photoprinting head 45 is controlled by the head control circuit 44 and the image represented by the digital image data stored in the frame memory 40 is printed. The printed image is a frame image constituted by digital image data of a first frame and digital image data of a second frame obtained by simultaneous photography. This means that the vertical resolution is high and that the image is not blurred.

Figure 6:
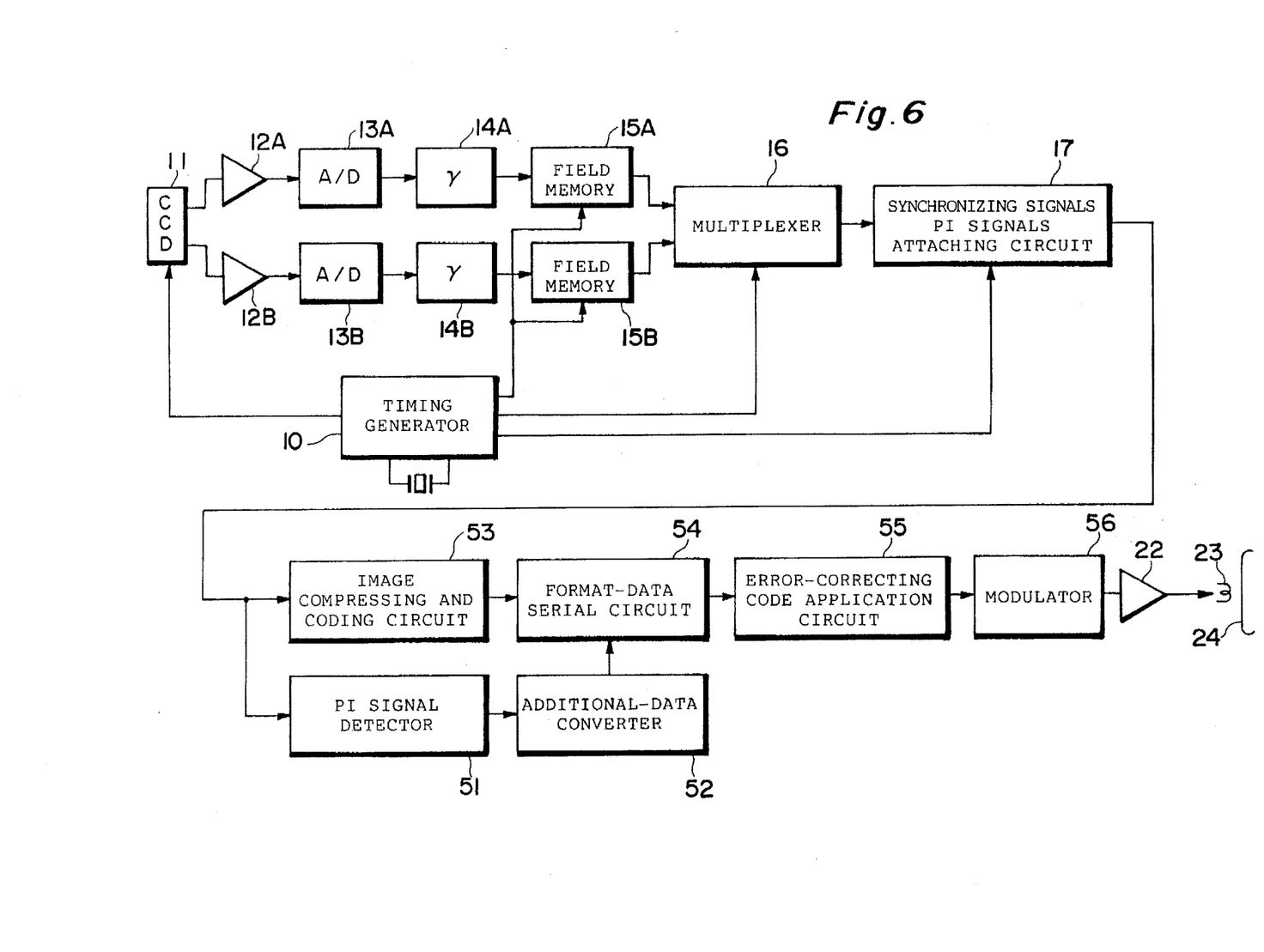
FIG. 6 is a block diagram illustrating the electrical configuration of a digital movie video camera.

FIG. 6 is a block diagram showing the electrical configuration of a digital movie video camera.

Components in FIG. 6 identical with those shown in FIG. 1 are designated by like reference characters and need not be described again. In a manner similar to that of the analog movie video camera illustrated in FIG. 1, the digital movie video camera shown in FIG. 6 also performs photography of an image of a first field and an image of a second field alternately every 1/60 of a second, as shown in FIG. 3, and records the obtained video signal on video tape. In a manner similar to that of the movie video camera shown in FIG. 1, ordinarily the image of the first field and the image of the second field are recorded alternately every 1/60 of a second.

At a predetermined timing, however, an image of a first field and an image of a second field obtained by simultaneous photography are recorded.

In the digital movie video camera illustrated in FIG. 6, the digital image data outputted by the circuit 17 which adds on the synchronizing signals and the PI signal is applied to a prescribed image compressing and coding circuit 53 and to a PI-signal detector circuit 51. The digital image data is subjected to DCT (discrete cosine transformation), run-length coding, etc., in the circuit 53 and the resulting data is applied to a format-data serial circuit 54. The PI-signal detector circuit 51 detects the PI signal added on by the circuit 17 and applies the signal to an additional-data converting circuit 52. The latter converts the PI signal to additional data in such a manner as to be suited to the format of a digital movie video camera. The PI signal thus converted to data in the additional-data converting circuit 52 is applied to the format-data serial circuit 54.

The compressed and coded digital image data and the PI signal converted to additional data is converted to a data serial by the format-data serial circuit 54 in such a manner as to be suited to the recording format of a digital movie video tape recorder. The resulting data is applied to an error-correcting code application circuit 55. When an error-correcting code is added on by the circuit 55, modulation is performed in a modulating circuit 56. The modulated digital image data is amplified by the amplifier circuit 22 and the amplified signal is applied to the magnetic head 23. The digital image data is recorded on the video tape 24 by the magnetic head 23.

Figure 7:
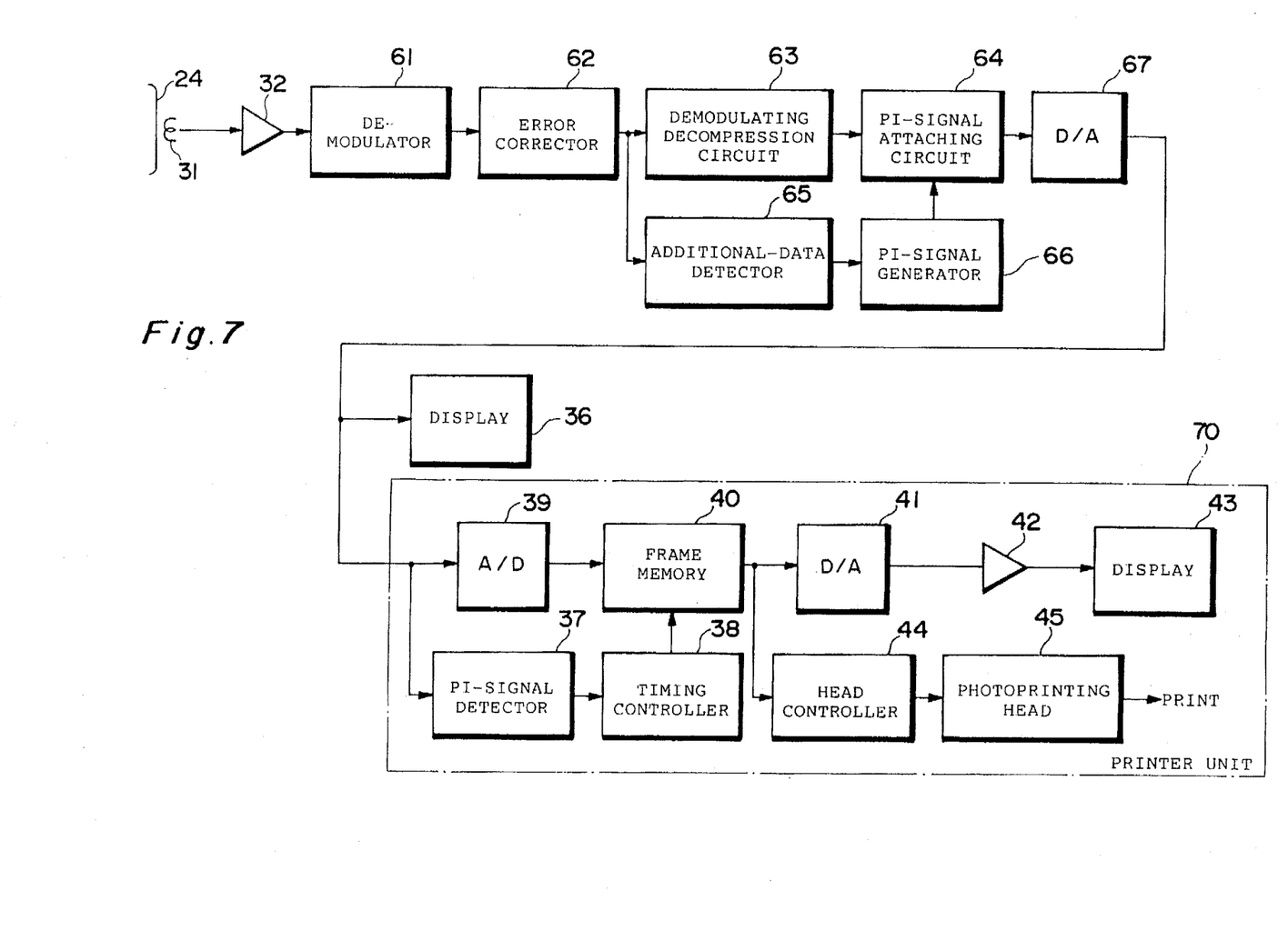
FIG. 7 is a block diagram showing the electrical configuration of a reproduction apparatus having a function for printing a video tape on which digital image data has been recorded.

FIG. 7 is a block diagram showing the electrical configuration of an apparatus for reproducing the digital image data that has been recorded on the video tape by the digital movie video camera. The reproduction apparatus shown in FIG. 7 also has the function of a printer in the manner as the reproduction apparatus illustrated in FIG. 5. Components in FIG. 7 identical with those shown in FIG. 5 are designated by like reference characters and need not be described again.

Digital image data that has been recorded on the video tape 24 is read by the magnetic head 31 and then applied to the amplifier circuit 32 so as to be amplified. The digital image data outputted by the amplifier circuit 32 is demodulated by a demodulating circuit 61 and the demodulated data is applied to an error correcting circuit 62. The latter subjects the digital image data to error correcting processing and applies the result to a demodulating decompression circuit 63 and an additional-data detector circuit 65.

The demodulating decompression circuit 63 subjects coded digital image data to demodulating processing and subjects compressed digital image data to decompression processing and the applies the result to a PI-signal attaching circuit 64. Further, the additional-data detector circuit 65 detects additional data and applies the result to a PI-signal generating circuit 66, with the PI signal is generated based upon the additional data. The PI signal generated by the PI-signal generating circuit 66 is applied to the PI-signal attaching circuit 64.

The PI-signal attaching circuit 64 adds on the PI signal in the V blanking interval of the digital image data, as shown in FIG. 4, and applies the resulting signal to a D/A converter circuit 67. The D/A converter circuit 67 converts the digital image data to an analog video signal and applies the analog video signal to the display unit 36 and printer unit 70. The movie image is reproduced on the display unit 36. The printer unit 70 detects the PI signal, detects, on the basis of the PI signal, digital image data of a first field and digital image data of a second field obtained by simultaneous photography, and obtains a printed image from these items of data. The printing image obtained has a high vertical resolution and is not blurred.

As many apparently widely different embodiments of the present invention can be made without departing from the spirit and scope thereof, it is to be understood that the invention is not limited to the specific embodiments thereof except as defined in the appended claims.

What is claimed is:

1. A movie video camera comprising:

a solid-state electronic image sensing device having a first light-receiving section for outputting a video signal of a first field and a second light-receiving section for outputting a video signal of a second field;

means for controlling said solid-state electronic image sensing device so as to repeat, a prescribed number of times, movie video-signal output processing in which a video signal of a first field and a video signal of a second field are outputted by exposing said first light-receiving section and said second light-receiving section at different timings, and execute movie/still video-signal output processing in which a video signal of a first field and a video signal of a second field are outputted in order by exposing said first light-receiving section and said second light-receiving section at the same timing a single time after said movie video-signal output processing has been repeated the prescribed number of times;

identification code generating means for generating and outputting codes for identifying the video signals of the first and second fields outputted from said solid-state image sensing device by said movie/still video-signal output processing; and recording means for recording, on a recording medium, the video signals outputted by said solid-state image sensing device and the identification codes outputted by said identification code generating means.

2. An apparatus for reproducing a movie video signal, comprising:

reading means for reading video signals and codes from a recording medium, wherein a video signal of a first field and a video signal of a second field are recorded on said recording medium repeatedly a prescribed number of times, video signals of first and second fields being obtained by exposing, at different timings, a first light-receiving section, which outputs a video signal of a first field, and a second light-receiving section, which outputs a video signal of a second field, of a solid-state electronic image sensing device, a video signal of a first field and a video signal of a second field, which are obtained by exposing said first light-receiving section and said second light-receiving section at the same timing a single time after the recording performed the prescribed number of times, are recorded on the recording medium, and codes for identifying the video signals of the first and second fields obtained by the simultaneous exposure are recorded on said recording medium, said reading means reading these video signals and these codes from the recording medium;

reproducing means for reproducing the video signals read by said reading means;

identification-code extracting means for extracting the identification codes read by said reading means; and video-signal extracting means for extracting and outputting, based upon the identification codes extracted by said reading means, the video signals of simultaneous exposure read by said reading means.

3. A method of recording a movie video signal, comprising the steps of:

controlling a solid-state electronic image sensing device, which has a first light-receiving section for outputting a video signal of a first field and a second light-receiving section for outputting a video signal of a second field, so as to repeat, a prescribed number of times, movie video-signal output processing in which a video signal of a first field and a video signal of a second field are outputted in order by exposing said first light-receiving section and said second light-receiving section of said solid-state electronic image sensing device at different timings, and execute movie/still video-signal output processing in which a video signal of a first field and a video signal of a second field are outputted in order by exposing said first light-receiving section and said second light-receiving section at the same timing a single time after said movie video-signal output processing has been repeated the prescribed number of times;

generating codes for identifying the video signals obtained by the simultaneous exposure; and recording, on a recording medium, the video signals outputted by said solid-state image sensing device and the generated identification codes.

4. A method of reproducing a movie video signal, comprising the steps of:

reading video signals and codes from a recording medium, wherein a video signal of a first field and a video signal of a second field are recorded on the recording medium repeatedly a prescribed number of times, video signals of first and second fields being obtained by exposing, at different timings, a first light-receiving section, which outputs a video signal of a first field, and a second light-receiving section, which outputs a video signal of a second field, of a solid-state electronic image sensing device, a video signal of a first field and a video signal of a second field, which are obtained by exposing said first light-receiving section and said second light-receiving section at the same timing a single time after the recording performed the prescribed number of times, are recorded on said recording medium, and codes for identifying the video signals of the first and second fields obtained by the simultaneous exposure are recorded on said recording medium, these video signals and these codes being read from said recording medium;

reproducing the video signals that have been read;

extracting the identification codes that have been read; and extracting and outputting, based upon the identification codes that have been extracted, the video signals of simultaneous exposure that have been read.

* * * * *